(12) United States Patent
Sämann et al.

(10) Patent No.: US 7,607,817 B2
(45) Date of Patent: Oct. 27, 2009

(54) EXTRUDER HAVING A SET BACK GAS-PERMEABLE WALL PORTION

(75) Inventors: Hans-Joachim Sämann, Bietigheim-Bissingen (DE); Werner Wiedmann, Stuttgart (DE); Jürgen Strecker, Korntal-Münchingen (DE); Peter Heidemeyer, Kornwestheim (DE); Sören Welb, Ilsfeld (DE)

(73) Assignee: Coperion GmbH, Stuttgart (DE)

( * ) Notice: Subject to any disclaimer, the term of this patent is extended or adjusted under 35 U.S.C. 154(b) by 0 days.

(21) Appl. No.: 12/056,518

(22) Filed: Mar. 27, 2008

(65) Prior Publication Data

US 2008/0248152 A1   Oct. 9, 2008

(51) Int. Cl.
*B29B 7/84* (2006.01)
*B29C 47/76* (2006.01)

(52) U.S. Cl. ............................. 366/75; 366/85; 425/203

(58) Field of Classification Search .................. 366/75, 366/79, 83–85; 425/203, 204, 208, 209
See application file for complete search history.

(56) References Cited

U.S. PATENT DOCUMENTS

| | | | | |
|---|---|---|---|---|
| 3,371,379 | A | * | 3/1968 | Reifenhauser ................ 96/196 |
| 3,572,647 | A | * | 3/1971 | Staheli ......................... 366/75 |
| 4,130,901 | A | * | 12/1978 | Borovikova et al. ............ 366/75 |
| 4,260,264 | A | * | 4/1981 | Maki et al. ..................... 366/75 |
| 4,578,455 | A | | 3/1986 | Pipper et al. |
| 6,367,960 | B2 | * | 4/2002 | Yamazaki et al. ............ 366/149 |
| 2008/0248152 | A1 | * | 10/2008 | Samann et al. ............... 425/208 |

FOREIGN PATENT DOCUMENTS

| | | |
|---|---|---|
| DE | 32 20916 A1 | 12/1983 |
| DE | 195 16 082 A1 | 11/1996 |
| GB | 1 227 150 | 4/1971 |
| JP | 09262830 A * | 10/1997 |
| JP | 11245283 A * | 9/1999 |
| JP | 11300811 A * | 11/1999 |
| JP | 2002210805 | 7/2002 |
| JP | 2003071831 A * | 3/2003 |

OTHER PUBLICATIONS

European Search Report EP 07 00 7281 dated Sep. 14, 2007 (6 pages).
Japan Steel Works, Ltd., Plastics Processing Technology News Letter, Sep. 18, 2000, (2 pages).

* cited by examiner

*Primary Examiner*—Charles E Cooley
(74) *Attorney, Agent, or Firm*—James B. Conte

(57) ABSTRACT

An extruder with a housing comprising parallel, partially inter-engaging bores and screws disposed therein is used when applying a method of feeding powdery bulk materials into such an extruder. A solid transport of powdery bulk material takes place in an inlet zone disposed downstream of a feed opening wherein said inlet zone is partially filled. The inlet zone is provided with at least one gas-permeable wall portion wherein a layer of bulk material is created on said wall portion, thereby preventing bulk material from passing through, The gas-permeable wall portion is connected to a vacuum source and to a pressure gas source. Furthermore, the gas-permeable wall portion has an inner wall which is set back with respect to the wall of the bores, thereby forming a gap with a partially annular cross section wherein a layer of the bulk material is formed in the gap.

7 Claims, 5 Drawing Sheets

EXTRUDER HAVING A SET BACK GAS-PERMEABLE WALL PORTION

BACKGROUND OF THE INVENTION

1. Field of the Invention

The invention relates to an extruder for processing powdery bulk materials, comprising a housing; at least one bore that has a bore wall; a feed opening for the powdery material which is disposed on one end of the housing; one screw each that is disposed in the at least one bore wherein said screw has one screw conveyor portion each that is disposed downstream of the feed opening so as to form an inlet zone and at least one portion that is disposed downstream of the screw conveyor portion for processing the bulk material; a metering device that is disposed upstream of the feed opening for feeding in the powdery bulk material and that is designed in a way as to ensure that at least the inlet zone of the extruder is only partially filled during the operation; a vacuum housing portion in the inlet zone wherein said vacuum housing portion has a gas-permeable porous wall portion of sinter material which has a multitude of ducts; and a drive for the at least one screw.

2. Background Art

Such an extruder is known from GB 1 277 150. This disclosure provides a conventional screen or a filter of a sinter material as a vacuum housing portion in order to de-aerate the bulk material to be processed which contains a large amount of air. The porous wall portion may be plane and disposed at a considerable distance from the bores in the housing. Alternatively, said porous wall portion may be disposed in alignment with the bore walls. It has turned out that in the latter case, the wall of the porous wall portion facing the bore was clogged by plasticized plastics adhering thereto, thereby preventing the desired effect of de-aeration. In the former case, de-aeration was stopped almost entirely.

Another extruder is known from DE 195 16 082 A1. This disclosure is based on the fundamental problem that the feeding of powdery bulk material to an extruder is rather difficult. In order to be able to dispense with pre-compressing feeding devices such as plug screw feeders, the inlet zone or solid conveying zone, respectively, is provided with openings whose diameters are so large that they enable gas and solids to be discharged when a low pressure in the range of 0 to 50% is applied. The sole purpose of this low-pressure feeding is the degassing of the bulk material. Another function thereof is to prevent a reverse degassing via the inlet opening which also impairs the feeding of bulk material. Moreover, this allows a pressure build-up to occur as early as in the inlet zone. Another supposed advantage is that an increase of the frictional coefficient occurs on the housing in the vicinity of the openings serving for the discharge of gas and material. A drawback is, however, that some of the powdery solid material is extracted through the openings along with gas. Thus, a sufficient operational safety and efficiency is not guaranteed.

An extruder of the generic type is known from the release of the "The Japan Steel Works, Ltd., Plastic Processing Technology News Letter", De-Gassing-Cylinder "DGC"—which is equipped with a filter serving as a gas-permeable wall portion through which air but also large amounts of process gas such as water vapour in ABS and wood flour are to be extracted. Here, too, some of the solid material is extracted through the filter openings. Apart from that, there is also the risk that the filter openings might be clogged by the powdery bulk material.

A respective roller press, wherein a screw-type extruder is disposed directly in front of a roller gap, is known from DE 32 20 916 A1 for the compression of powdery or finely crystalline bulk material, wherein the screw-type extruder has a screw housing which has a porous body by means of which a suction opening is formed for the air that is liberated by compressing the powdery bulk material in front of the roller gap. The continuous extraction of air directly in front of the rollers provides the conditions for the desired high compression of the bulk material in the roller gap. Thus, the screw-type extruder serves to pre-compress the powder whilst feeding it under pressure to the roller gap. The screw-type extruder is completely filled with bulk material.

SUMMARY OF THE INVENTION

It is the object of the invention to design an extruder of the generic type in a way as to ensure a problem-free operation even of a partially filled and therefore substantially pressureless extruder when feeding in powdery and in particular dusty bulk materials whilst increasing the previously attainable throughput of such powdery or dusty bulk materials.

According to the invention, this object is met in the extruder of the generic type by said extruder having a gas-permeable wall portion which has an inner wall that defines the at least one bore and that is set back with respect to the bore wall, thereby forming a gap with a partially annular cross-section, wherein the gap has a constant thickness D to which applies: $2.0 \text{ mm} \leq D \leq 30 \text{ mm}$, and wherein the gas-permeable wall portion is connected to a pressure-gas source by means of a pressure purge line. Due to the fact that a layer of powdery bulk material of an even thickness is created on the gas-permeable wall portion by applying a low pressure without extracting any of the powdery bulk material, no additional procedures, such as gas-solid separation and re-feeding of the bulk material, due to an un-wanted discharge of bulk material are required. The layer of bulk material considerably increases wall friction, thereby considerably improving the transport, or conveyance, of the bulk material. De-gassing of the bulk material that is transported as a solid in the partially filled inlet zone takes place in the usual manner. Thus, there is no significant degassing occurring through the gas-permeable wall portion. Surprisingly, it has been found that there is no clogging of the wall of the porous wall portion facing the bore due to plasticized material adhering thereto. On the other hand, there is no active extraction of air through the porous wall portion during the entire processing process, thus resulting in a virtually unclogged porous wall portion. This may be influenced by adaptively selecting the sinter material.

Further features, details and advantages of the invention will become apparent from the ensuing description of an embodiment.

DESCRIPTION OF THE PREFERRED EMBODIMENTS

Figure 1:
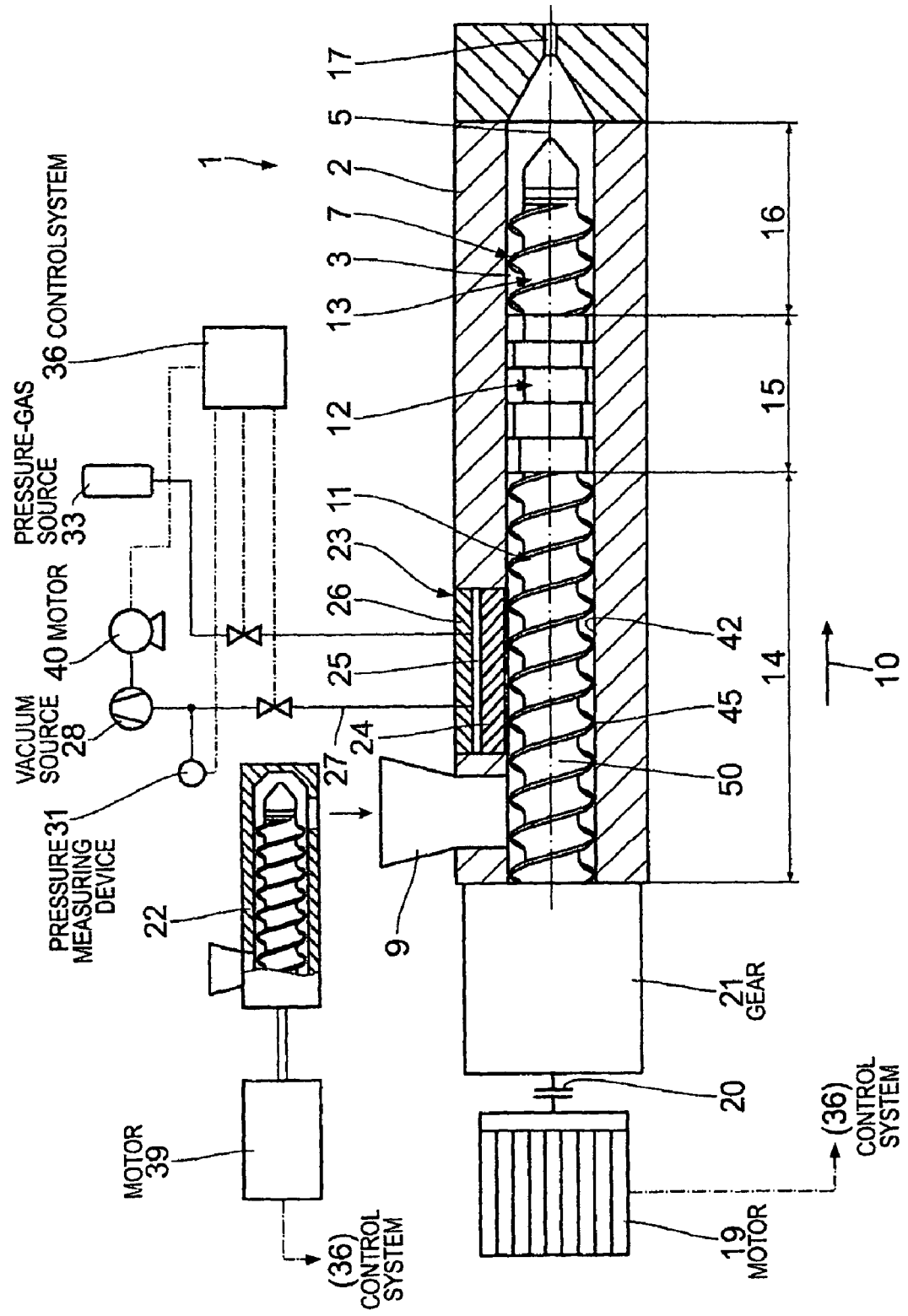
FIG. 1 shows a vertical longitudinal section through an extrusion system comprising an extruder.
Figure 2:
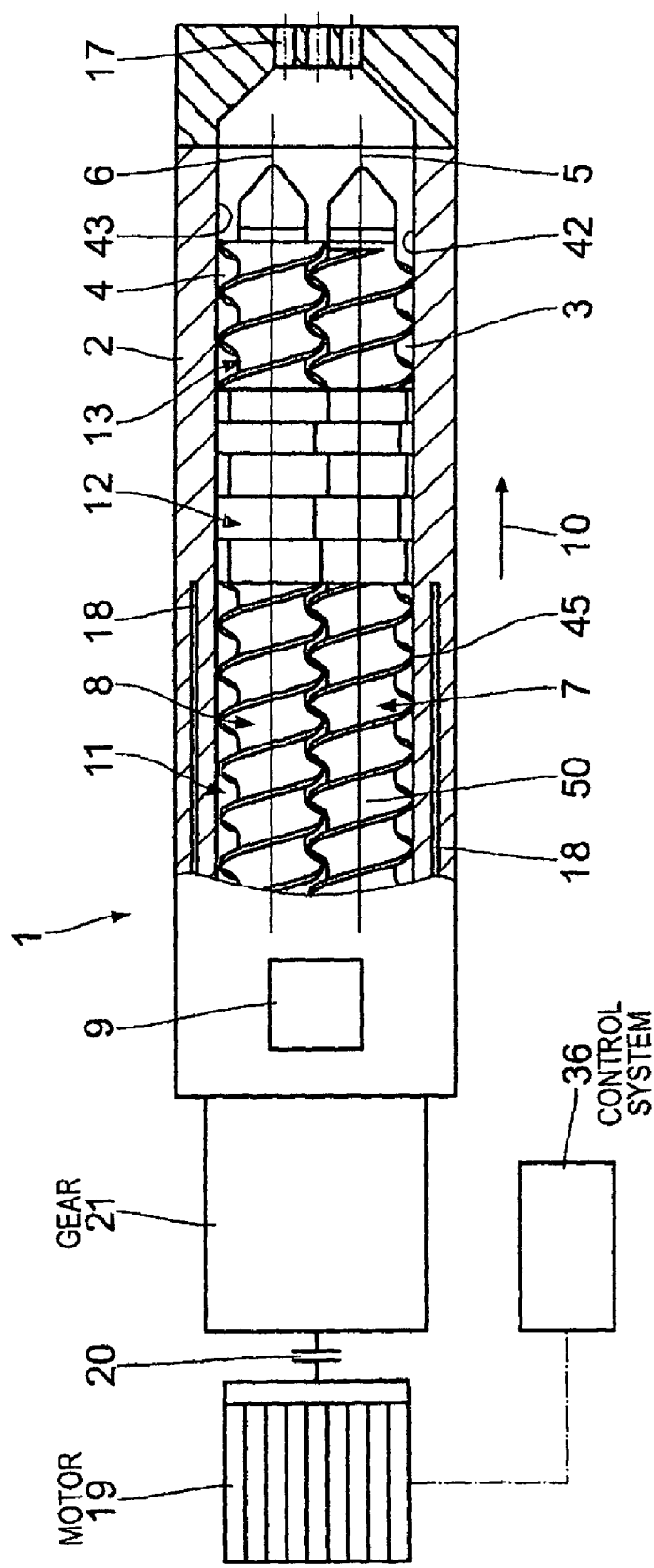
FIG. 2 shows a horizontal longitudinal section through the extruder according to FIG. 1.

The extrusion system shown in the drawing has an extruder 1. In the housing 2 thereof, which is usually composed of several housing sections, bores 3, 4 are formed that interengage in the manner of a figure eight and have parallel axes 5, 6. Two screws 7, 8 are disposed in the housing bores 3, 4. The screws are closely intermeshing screws 7, 8 rotating in the same direction. On one end—the left-hand end in FIGS. 1 and 2—a feed hopper 9 opens into the bores 3, 4. Seen in a transport direction 10, starting from the feed hopper 9, the screws 7, 8 are provided with a first screw conveyor portion 11, a kneading-disk portion 12 adjacent thereto and another, second screw conveyor portion 13.

The first screw conveyor portion 11 extends over an inlet zone 14 acting as a solid conveying zone. In this embodiment, the kneading-disk portion 12 defines a melting zone 15. The second screw conveyor portion 13 defines a pressure build-up zone 16. At the end of the housing 2, a discharge nozzle 17 adjoins the pressure build-up zone 16. As can be seen in the drawing as well, a defined portion of the inlet zone 14 of the housing 2 is provided with cooling ducts 18.

The screws 7, 8 are driven by means of an electric motor 19 which is drivably connected to a reduction and distribution gear 21 via a coupling 20. The screws 7, 8 in turn are coupled to the gear 21 in the usual manner.

A metering device 22, which is a gravimetric metering screw feeder for example, is disposed above the feed hopper 9. The housing 2 has a vacuum housing portion 23 disposed at a small but defined distance behind the feed hopper 9, said vacuum housing portion 23 thus extending over a partial area of the inlet zone 14. The vacuum housing portion 23 has an inner porous wall portion 24 which partially delimits the bores 3, 4 and consists of sinter material and in which ducts are formed—not shown in the drawing—that enable gas to pass through the porous wall portion 24. A vacuum chamber 25 adjoins the outside of the porous wall portion 24 which is—of course—sealed to the outside by means of a wall 26. A vacuum line 27 passes through said wall 26 and opens into the vacuum chamber 25. The vacuum line 27 is connected to a vacuum source 28, such as a liquid ring pump.

According to FIGS. 1 to 4, such vacuum housing portions 23 may delimit the horizontally extending bores 3, 4 towards the top, which means they are disposed approximately parallel to the plane spanned by the axes 5, 6. Thus, in the embodiment according to FIGS. 1 to 4, both of the bores 3, 4 are simultaneously acted upon by vacuum via a single upper porous wall portion 24.

Figure 5:
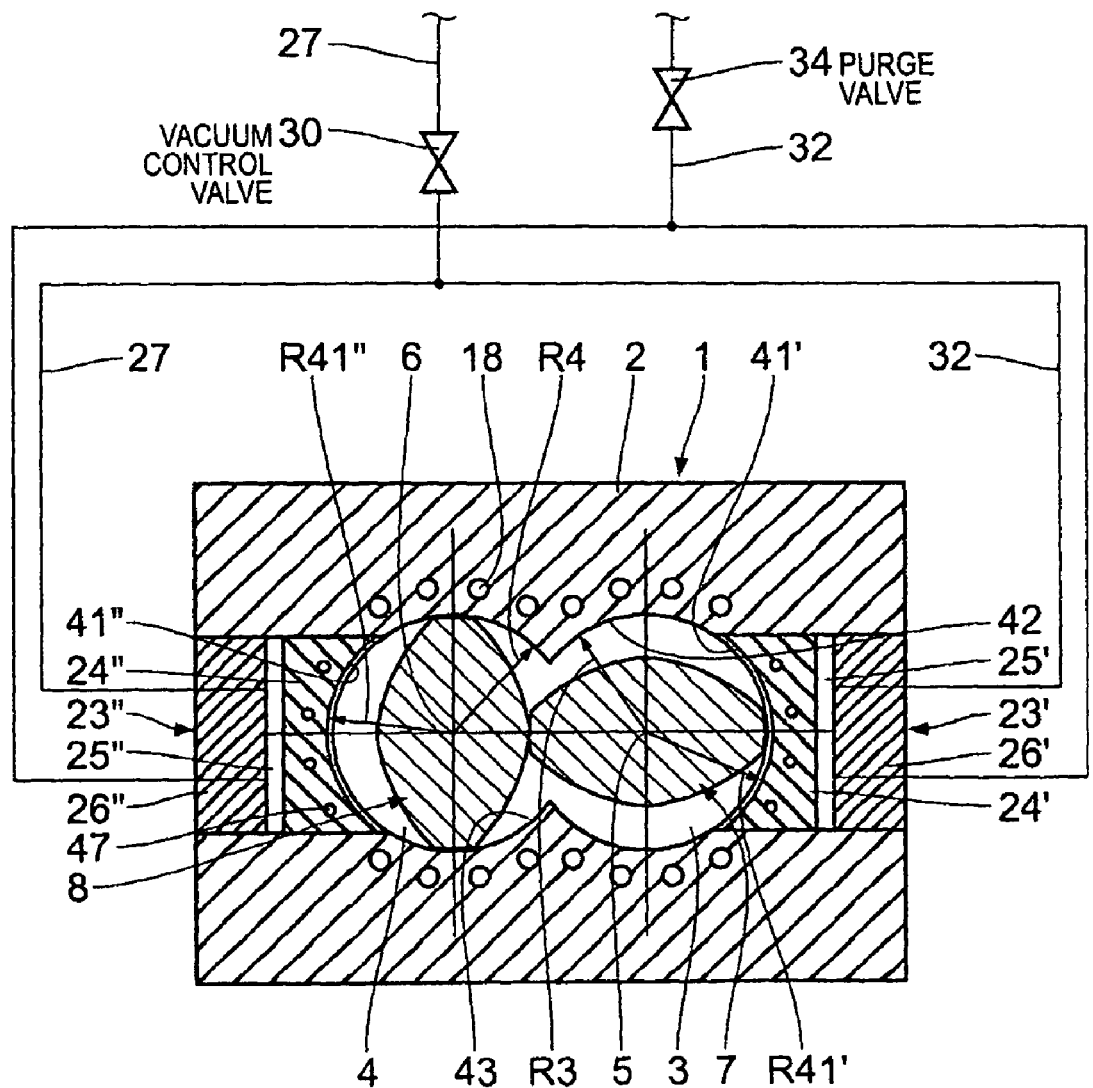
FIG. 5 shows a cross-section through the extruder comprising a second possible embodiment of a gas-permeable wall portion.

Finally, in the embodiment according to FIG. 5, one vacuum housing portion 23', 23" each, comprising porous wall portions 24' and 24", is disposed on one side of the bores 3 or 4, respectively, strictly speaking on the left- and right-hand sides, which means that the porous wall portions 24' and 24" are disposed in the plane spanned by the axes 5, 6.

The remaining components of the vacuum housing portions 23', 23" shown in FIG. 5 that correspond to comparable components or areas, respectively, in FIGS. 1 to 4 are indicated by the same reference numerals, followed by one or two apostrophe(s), respectively.

A vacuum control valve 30 is disposed in the vacuum line 27. Moreover, a pressure measuring device 31 is disposed between the vacuum source 28 and the valve 30.

Moreover, each vacuum chamber 25 is connected to a pressure-gas source 33 via a pressure purge line 32 wherein a purge valve 34 is fitted into the line 32. The pressure measuring device 31 sends measuring signals, which correspond to the respective pressure measured in line 27, to a central control system 36 via a signal line 35. The central control system 36 in turn operates the vacuum control valve 30 via a vacuum control line 37. Moreover, the control system operates the purge valve 34 via a line 38. Finally, the control system operates the drive motor 39 of the metering device 22, the drive motor 19 of the extruder 1 and the motor 40 of the vacuum source 28.

What is essential is that the porous inner wall 41, 41', 41" of the respective porous wall portions 24 or 24', 24" defining the respective bore 3, 4 has a partially annular cross-section and is set back with respect to the respective bore wall 42 or 43 so that $R3=R4<R41$ (or $R41'$ or $R41"$, respectively). In this respect, R3 and R4 are the radii of the bores 3 and 4, respectively, while R41, R41' and R41" are the radii of the respective porous inner walls 41 or 41' or 41", each radius being measured from the respective axis 5 or 6. Thus, compared to the clearance 46 between the respective ridge 45 and the respective bore wall 42 or 43, this embodiment enables an enlarged gap 44 or 44' or 44", respectively, to be created between the respective ridge 45 of the screws 7 or 8, respectively, with respect to the respective inner wall 41 or 41' or 41". This gap 44 or 44' or 44", respectively, therefore has a constant thickness D in the radial direction to which applies: $D=R41$ (or $R41'$ or $R41"$, respectively)$-R4$ (or $R3$, respectively), wherein applies: $2.0 \text{ mm} \leq D \leq 30 \text{ mm}$. The larger R3 or R4, respectively, i.e. the larger the extruder, the larger becomes D.

Figure 3:
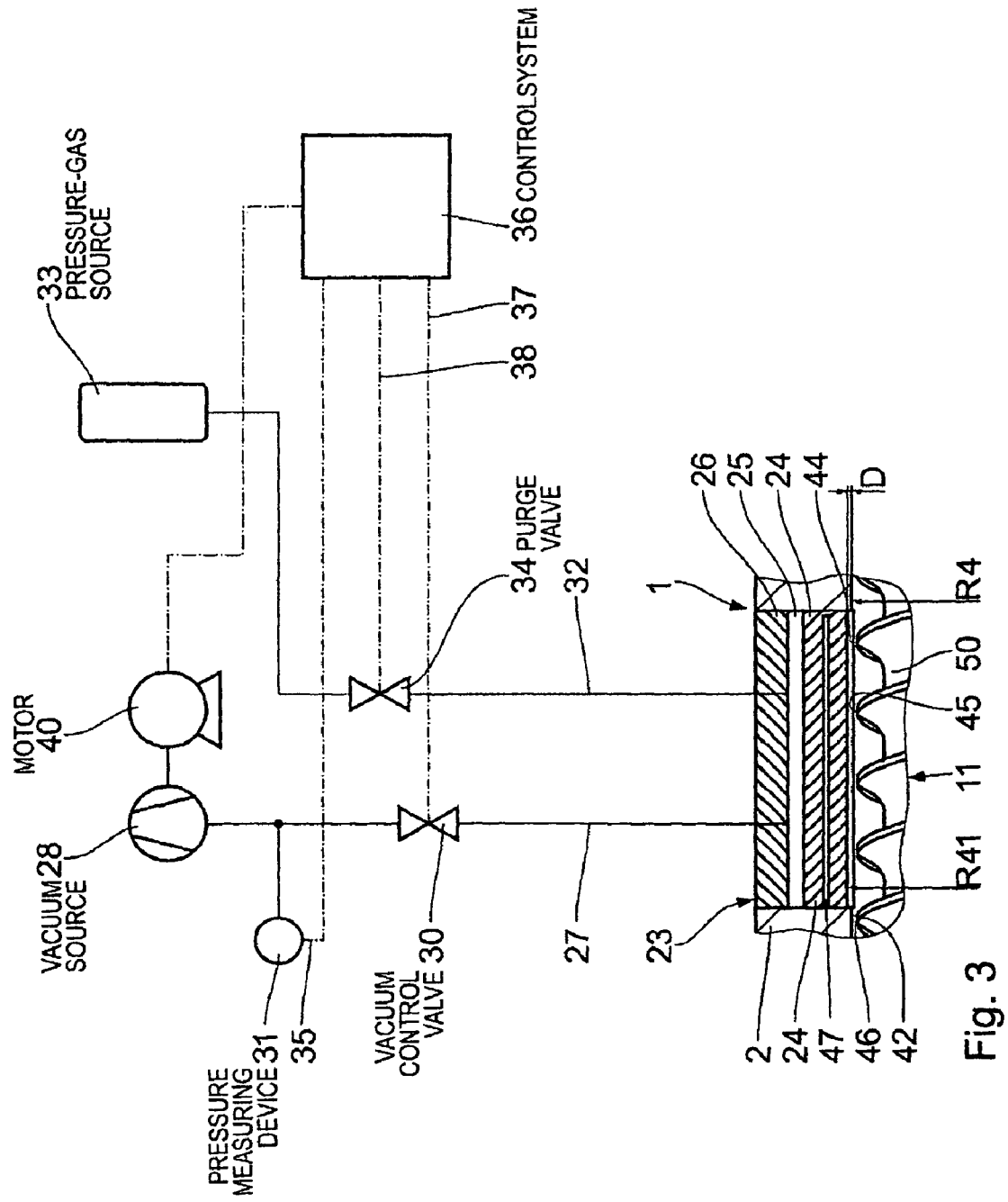
FIG. 3 shows an enlarged partial view of FIG. 1.
Figure 4:
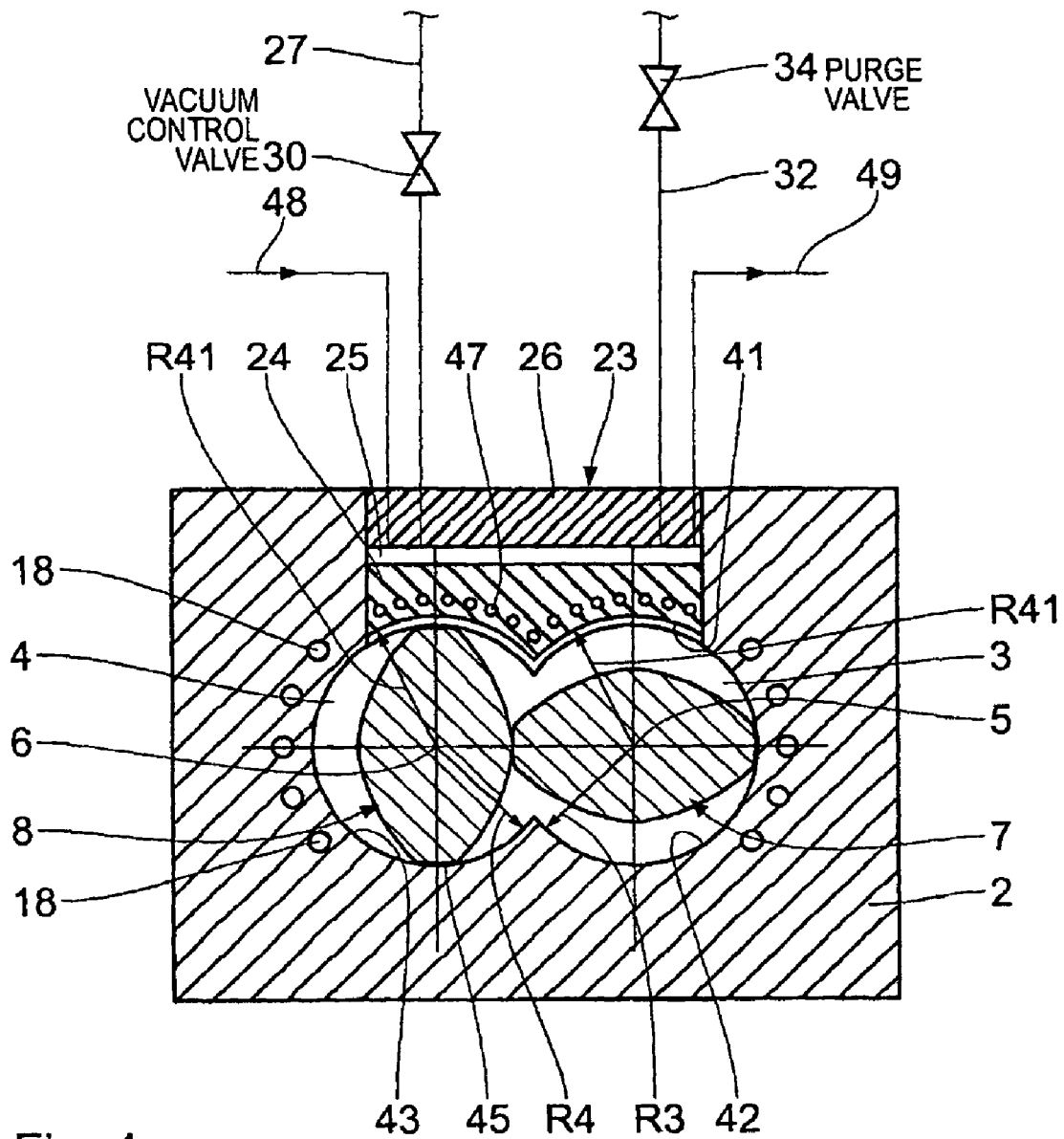
FIG. 4 shows a cross-section through the extruder comprising a first possible embodiment of a gas-permeable wall portion.

As can be seen in FIGS. 3 to 5, cooling ducts 47 are formed in the respective vacuum housing portions 23 or 23', 23" as well, strictly speaking in the respective porous wall portions 24 or 24', 24", which are supplied with coolant via a coolant supply line 48 and a coolant discharge line 49.

The mode of operation is as follows:

Powdery or dusty bulk materials, respectively, are fed in by means of the metering device 22. Said powdery bulk material may be a polymer but also any other bulk material to be processed by means of multi-shaft extruders. Feeding of the powdery bulk material is matched to the rotational speed of the screws 7, 8 in a way as to ensure that the extruder 1 is only partially filled during the operation.

The vacuum housing portion(s) 23 are acted upon by a corresponding low pressure, which is referred to as vacuum in this disclosure, in a way that in this area, the powdery bulk material is held in a layer, which has a thickness that corresponds to the clearance 44 between screw ridge 45 and inner wall 41 of the wall portions 24, and thus adheres to the porous wall portion(s) 24. This increases the friction between the bulk material to be transported and the inner wall 41, which in turn results in an increased transport of bulk material. Due to the fact that the ducts—not shown in the drawing—that are formed in the porous wall portions 24 are smaller than the grain size of the bulk material to be transported, the latter is not drawn into the porous wall portions 24, thereby preventing said porous wall portions 24 from clogging. The width of the ducts in the porous wall portions 24 is generally below or within the range of the grain size distribution of the bulk material. The grain size distribution of the bulk material usually extends over a specific range covering extremely fine up to less fine grain sizes. Likewise, the ducts formed in the porous wall portions 24 have a width extending over a specific range. It has been found that a clogging of these ducts may be effectively prevented if the diameter or width range, respectively, of the ducts in the porous wall portions 24 is within or below the described grain size distribution. For example, duct widths of 15 to 90 μm are suitable for a grain size distribution between D10=30 μm and D90=160 μm. The lower diameter D10 indicates that a maximum of 10% of the powdery bulk material has a diameter that is smaller than or equal to the indicated diameter, i.e. 30 μm. D90 means that 90% of the particles in the bulk material have a diameter which is smaller than or equal to the indicated value of 160 μm. In the present case, the following applies: D50=75 μm. Such a distribution ensures that when the vacuum is applied, a sufficiently large number of particles (grains) of the bulk material bears against the duct openings on the side of the screw so that the ducts do not clog at all or only to an insignificant extent.

The porous, i.e. gas-permeable wall portions 24 enable only that amount of gas, i.e. generally air or nitrogen to be extracted that is required for creating the mentioned layer of bulk material by means of low pressure. As soon as a compact or compressed layer of bulk material has formed on the respective inner wall 41 of the porous wall portions 24 when the extruder 1 is in the stationary state, only minute amounts of air or gas are extracted without thereby reducing the desired positive transport effects. The low pressure in the gap 44 only serves to retain the powdery material in this gap.

The compression of the bulk material in the vicinity of the inner wall 41 or 41', 41", respectively, causes a reduction of the density of the bulk material in the vicinity of the screw root 50. In case additional compression of the powdery bulk material occurs for example in zone 15, i.e. independently of the inlet zone 14 and outside said inlet zone 14, thereby causing the material to melt, the air that is present in the partially filled inlet zone 14 serving as a solid conveying zone is removed by a backflow in the direction towards the feed hopper 9. In case there is no such compression, the gas that is carried over may also be discharged in the transport direction 10.

The process zones 15, 16 and, if required, additional process zones that are disposed downstream of the inlet zone 14 may be zones used for melting, mixing, homogenizing, boiling, reacting, etc. However, there may also be an additional, spatially separated screw-type machine or extruder, respectively.

Even if the bulk material that is transported in the inlet zone 14 is a powdery polymer, for example, there is no risk of an unwanted clogging of the porous wall portion 24 or the inner wall 41 thereof, respectively, due to plasticized polymer settling thereon as a result of shearing. If there was such a polymer, it would be impossible to create a low pressure on the inner wall 41. This risk is excluded. As it has surprisingly been found, the enlarged gap 44 effectively prevents the plasticized polymer from adhering to the inner wall 41 of the vacuum housing portion 23. This is positively influenced by the cooling in the vicinity of the porous wall portions 24.

Should the case arise that the porous wall portions 24 are clogged by dusty bulk materials, this is indicated by the pressure measuring device 31 which in turn causes the control system 36 to close the vacuum control valve 30 and to open the purge valve 34, thereby triggering a pressure-gas purging, in the form of a pressure surge, of the porous wall portions 24 via the pressure purge line 32.

As can be seen from the above described embodiments, it is sufficient to apply the vacuum only to a respective partial circumferential area of the bores 3, 4 and to a small portion 23 of the inlet zone 14.

The term vacuum used within the scope of this application does not refer to an absolute vacuum in the physical sense but a very low pressure of for example 0.02 to 0.2 bar, i.e. a vacuum of 98 to 80%.

What is claimed is:

1. An extruder for processing powdery bulk materials, comprising
   a housing (2);
   at least one bore (3, 4) that
      has a bore wall (42, 43);
   a feed opening (9) for the powdery material which is disposed on one end of the housing (2);
   one screw (7, 8) each that is disposed in the at least one bore (3, 4) wherein said screw (7, 8) has
      one screw conveyor portion (11) each that is disposed downstream of the feed opening (9) so as to form an inlet zone (14), and
      at least one portion (12) that is disposed downstream of the screw conveyor portion (11) for processing the bulk material;
   a metering device (22) that is disposed upstream of the feed opening (9) for feeding in the powdery bulk material and that is designed in a way as to ensure that at least the inlet zone (14) of the extruder (1) is only partially filled during the operation;
   a vacuum housing portion (23) in the inlet zone (14) wherein said vacuum housing portion (23) has a gas-permeable porous wall portion (24) of sinter material which has a multitude of ducts; and
   a drive (19) for the at least one screw (7, 8),
   wherein
   the gas-permeable wall portion (24) has an inner wall (41) that defines the at least one bore (3, 4) and that is set back with respect to the bore wall (42, 43), thereby forming a gap (44, 44', 44") with a partially annular cross-section;
   wherein the gap (44, 44', 44") has a constant thickness D to which applies: $2.0 \text{ mm} \leq D \leq 30 \text{ mm}$; and
   wherein the gas-permeable wall portion (24) is connected to a pressure-gas source (33) by means of a pressure purge line (32) wherein a layer of powdery bulk material is formed in said gap to increase friction between the material and said inner wall to increase transport of said material and to prevent clogging of said gas-permeable porous wall portion.

2. An extruder according to claim 1, wherein the ducts in the gas-permeable porous wall portion (24), at least in the vicinity of the inner wall (41), have a width that is one of smaller than and equal to the average grain size of the powdery bulk material.

3. An extruder according to claim 1, wherein the vacuum housing portion (23) is provided with cooling ducts (47).

4. An extruder according to claim 1, wherein the vacuum housing portion (23) is disposed above the at least one bore (3,4).

5. An extruder according to claim 1, wherein a vacuum housing portion (23', 23") is provided on the side of the at least one bore (3, 4).

6. An extruder according to claim 1, wherein at least two parallel, partially inter-engaging bores (3, 4) are formed in the housing (2).

7. An extruder according to claim 6, wherein one vacuum housing portion (23', 23") each is provided on the side of each bore (3, 4).

* * * * *

UNITED STATES PATENT AND TRADEMARK OFFICE
CERTIFICATE OF CORRECTION

| | | |
|---|---|---|
| PATENT NO. | : 7,607,817 B2 | Page 1 of 1 |
| APPLICATION NO. | : 12/056518 | |
| DATED | : October 27, 2009 | |
| INVENTOR(S) | : Hans-Joachim Samann et al. | |

It is certified that error appears in the above-identified patent and that said Letters Patent is hereby corrected as shown below:

On the Title page add: Item (30)    Foreign Application Priority Data
                        Apr. 7, 2007 (EP)...07 007 281.4

Signed and Sealed this
Fifth Day of April, 2011

David J. Kappos
*Director of the United States Patent and Trademark Office*